Feb. 17, 1953  J. H. ARNOLD ET AL  2,628,970
SYNTHESIS OF LIQUID HYDROCARBONS
Filed July 7, 1950
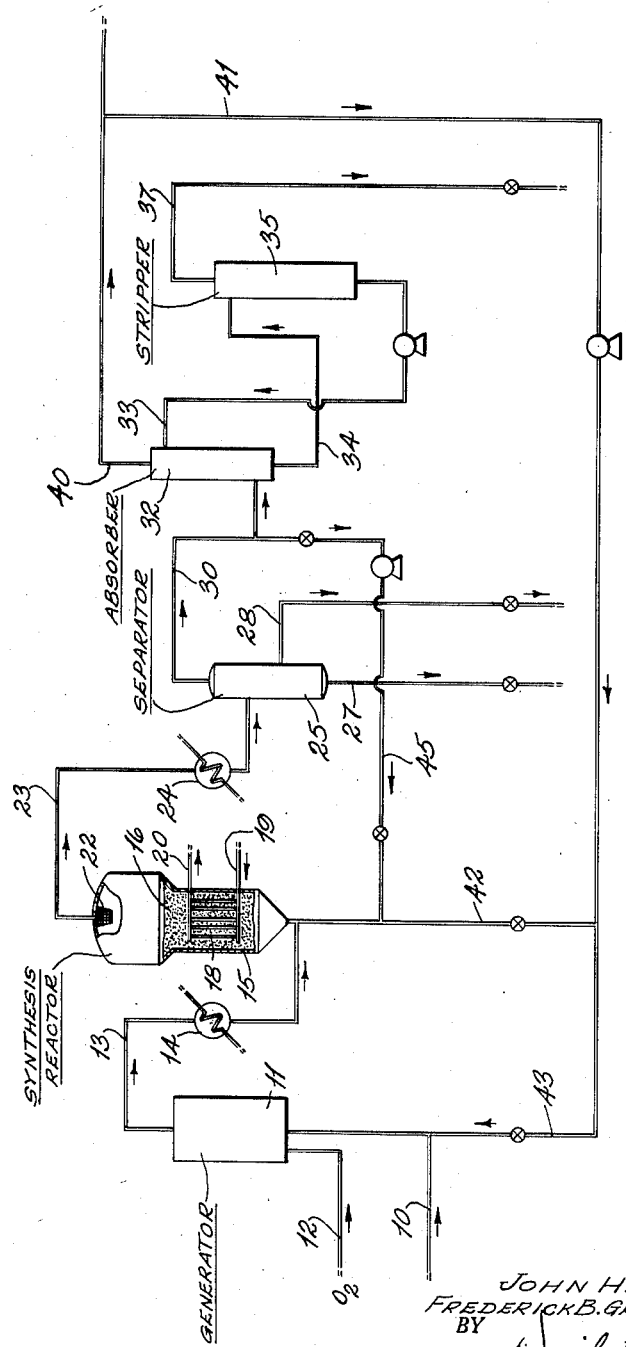
INVENTORS
JOHN H. ARNOLD
FREDERICK B. GROSSELFINGER
BY
ATTORNEYS Patented Feb. 17, 1953

2,628,970

UNITED STATES PATENT OFFICE 2,628,970

SYNTHESIS OF LIQUID HYDROCARBONS

John H. Arnold, Summit, N. J., and Frederick B. Grosselfinger, New York, N. Y., assignors to Hydrocarbon Research, Inc., New York, N. Y., a corporation of New Jersey Application July 7, 1950, Serial No. 172,478

4 Claims. (Cl. 260—449.6)

1

The present invention relates to the catalytic synthesis of normally liquid hydrocarbons from synthesis gas mixtures consisting essentially of hydrogen and carbon monoxide. It particularly contemplates overcoming the hitherto inconsistent objectives of high yield and long catalyst life by observing mutually effective conditions of operation which simultaneously result in maximum yield of desired products, prolonged catalyst life and reduced catalyst disintegration.

Yet more specifically, the present invention is concerned with a process, as above, involving gas generation by partial oxidation of a carbonaceous material such as methane or other hydrocarbon, in the presence of sufficient combining proportion of substantially pure oxygen to yield a synthesis gas consisting of at least about 95 per cent by volume of hydrogen and carbon monoxide in a molar ratio of from about 1.8:1 to 2.1:1. The resulting synthesis gas flows to a synthesis reactor where it passes in contact with an iron, hydrocarbon synthesis catalyst at elevated pressure and temperature within the range at which the catalyst is effective for the direct synthesis of liquid hydrocarbons. The effluent products are withdrawn from the synthesis reaction zone and subjected to treatment for the recovery of the desired hydrocarbon fractions.

However, in such operations, the catalyst tends to become excessively carbonized, resulting ultimately in physical disintegration. This is particularly disadvantageous in a fluidized catalyst system where catalyst losses become intolerable and the entire fluidized bed of catalyst may be carried out of the reaction zone with the products of reaction.

It has been found that realization of tolerable minimum rates of catalyst disintegration and/or of excessive carbon deposition on the synthesis catalyst is attainable by maintaining a high hydrogen concentration during the course of the synthesis reaction. Simultaneously, there is recycled to the gas generation step and the hydrocarbon synthesis zone, in critical quantity, the normally gaseous fraction, that is, the tail gas, of the withdrawn effluent product stream from the synthesis zone. It is contemplated dividing the recycle stream so that a critical minor proportion thereof is returned to the step of generating synthesis gas, while the remainder continually passes to the synthesis zone.

Through this critical combination of process variables, the present invention realizes both long catalyst life and high liquid product yield.

The hydrogen concentration, at the inlet of the synthesis zone, is continuously maintained in the range from about 35 to 55 volume per cent of the total feed, and the reactant stream is withdrawn from contact with the catalyst, with the carbon monoxide in the range of 1.5 to 4.0 per cent by volume, but before the hydrogen concentration of the effluent stream has fallen below about 20 volume per cent. Preferably, the inlet concentration of hydrogen is restricted to the range about 40 to 50 volume per cent and outlet concentration within the range of 25 to 30 volume per cent. Below these ranges, physical disintegration of the catalyst tends to become excessive, while at higher concentrations, liquid hydrocarbon yield is adversely affected.

The resulting gasiform effluent stream, withdrawn from the synthesis reaction zone, is treated to recover the normally liquid fractions including $C_3$ and higher hydrocarbons, leaving a residual tail gas composed of the normally gaseous constituents of the synthesis reaction zone effluent, and substantially free of $C_3$ and higher hydrocarbons. The total recycle is composed of this tail gas in an amount ranging from about 0.7 to about 1.6 volumes per volume of synthesis gas that would be generated by the partial combustion of the carbonaceous feed supplied to the generator in the absence of recycling. Expressed in terms of a carbonaceous feed composed of natural gas consisting essentially of methane, the critical range of recycle becomes about 2.0 to 4.5 volumes of tail gas per volume of natural gas fed to the generator.

As above indicated, a minor quantity of the total recycle stream is diverted as a feed to the synthesis gas generator, all of the remainder going to the synthesis reaction zone. The proportion of the recycle stream thus diverted to the generator amounts to from about 1 to about 15 per cent, and preferably from about 2 to 10 per cent by volume of the total recycled tail gas.

Advantageously, total recycle is maintained in the upper part of the critical total recycle range, and the proportion diverted to the generator is relatively low within the range of generator recycle, as for example, about 2–5 volume per cent. Under such conditions, the yield of liquid hydrocarbons can be easily increased as much as 3–5 per cent without any increase in the rate of carbonaceous feed and without a material increase in oxygen requirement.

At lower total recycle rates within the critical range above, the upper regions of the range of generator recycle are advantageously employed, as for example, about 5–10 per cent of the total.

Thus, the optimum generator recycle varies approximately inversely as the rate of total recycle. Stated in another way, the optimum generator recycle is approximately a value within its critical range which corresponds inversely to the value of the total recycle within its critical range.

It is to be particularly noted that within the ranges of total recycle and generator recycle disclosed herein, a substantial yield increase is realizable without an objectionable increase in oxygen requirement.

The recycle or tail gas, as above indicated, comprises the residual product effluent from the synthesis zone, after separation and recovery of normally liquid fractions; that is to say, the liquid product hydrocarbon fractions and the by-product water vapor removable by condensation. In particular, it is contemplated separating all except light gaseous hydrocarbons so that the recycle stream is substantially free from $C_3$ and higher hydrocarbons which are only difficultly liquefiable under normal conditions. To this end, therefore, the product effluent stream from the synthesis zone is preferably subjected to absorption or other treatment effective to remove the $C_3$ and higher hydrocarbon fractions prior to recycling to the generator. Substantially complete separation of all such fractions from the recycle stream to the synthesis zone is also advantageous.

It is to be particularly noted that realization of both a high yield of liquid hydrocarbons and a long catalyst life makes it necessary to regulate not only the reaction outlet concentration of hydrogen, but also the carbon monoxide concentration thereof. In other words, the reaction gases must be withdrawn from the synthesis zone before the hydrogen content has fallen below about 20 volume per cent, as above, and when the carbon monoxide content of the gaseous reaction stream has reached the range of about 1.5 to 4 per cent by volume, and preferably, about 2 to 3 per cent by volume.

It will be understood that the outlet concentrations of carbon monoxide and hydrogen may be regulated in various ways, as for example, by controlling the contact time via the reactant throughput rate, the depth of the catalyst bed, or the like.

In accordance with the present invention, the continuous charging of the resulting tail gas to both the generator and the synthesis zone produces a number of material benefits. As above intimated, the resultant gaseous atmosphere in the synthesis zone minimizes catalyst disintegration whereby dense fluidization is continuously maintainable by the upflowing reactant gas. Surprisingly, however, there is a simultaneous substantial increase in liquid product hydrocarbon yield based on the carbonaceous feed to the generator, characteristic of yields previously only encountered under conditions of excessive catalyst disintegration.

In order to describe the invention in more detail, reference is made to the attached flow sheet, illustrating more or less diagrammatically one embodiment of the present invention.

Therein, a stream of natural gas composed essentially of methane passes from a suitable source, not shown, such as a producing well, through pipe 10 into the bottom of a gas generator 11 simultaneously with a stream of substantially pure oxygen from any suitable source, not shown, introduced through pipe 12, and a portion of the recycled tail gas to be hereinafter described in detail and supplied through pipe 43.

Preferably, the reactants enter the generator through one or more mixing burners. Partial combustion of the natural gas takes place within the generator at a temperature of, say, 2000 to 2500° F. or upwards. The relative proportions of the oxygen-hydrocarbon feed materials are carefully regulated for conversion into synthesis gas consisting of at least about 95 per cent by volume of hydrogen and carbon monoxide in a molar ratio of about 1.8:1 to 2.1:1.

The synthesis gas is withdrawn from the generator by pipe 13, passed through cooling exchanger 14 and introduced at about 650° F. into a synthesis reactor 15 in contact with a fluidized mass of solid particle, iron, hydrocarbon synthesis catalyst having an upper pseudo-liquid level 16. Temperature in reactor 15 may vary in the range of about 500 to 700° F., and superatmospheric pressure of about 150–500 p. s. i. g. is preferred. Optimum yields are obtained at a temperature of about 600–650° F. and a pressure of about 250–450 p. s. i. g.

Regulation of the catalyst temperature may be realized in any number of ways, as for example, by an exchanger comprising spaced vertical cooling tubes 18 supplied with a coolant liquid, such as water, through inlet header 19, with withdrawal of coolant liquid through header 20.

The effluent reaction product stream from reactor 15 passes through separating filter 22, pipe 23 and condenser 24, into separator 25. Aqueous condensate is discharged therefrom through bottom pipe 27, while the liquid hydrocarbon layer is withdrawn through pipe 28 at an intermediate level. The residual, normally gaseous fractions pass overhead as at 30 into the absorber 32.

In the absorber 32, the gases pass upwardly through a packed tower or cascade system countercurrent to a downflow of stripping oil, which substantially completely removes $C_3$ and higher hydrocarbon fractions. The stripping oil may be any suitable hydrocarbon fraction, as for example, a kerosene fraction, or a cut of about 200–500° F. boiling range injected into the upper portion of the absorber 32 through pipe 33. The absorbate liquid containing the separated hydrocarbons collects in the bottom of the absorber and is withdrawn through pipe 34 to stripper 35, as indicated, where the light hydrocarbons are disengaged and removed overhead through pipe 37. The stripped oil is continuously recycled from the bottom of stripper 35 to the absorber, as indicated. The light hydrocarbons in pipe 37 may be combined with the product oil of line 28, for further treatment or recovery as desired.

As a result of this treatment, the tail gas from the synthesis reactor, substantially stripped of $C_3$ and higher hydrocarbon content, therefore passes out of the upper portion of absorber 32 through pipe 40, a portion being vented as indicated. The remaining portion of the stream in pipe 40, however, amounting to between 2.0 and 4.5 volumes per volume of natural gas fed to generator 11 is continuously withdrawn through branch recycle line 41, which, as shown, communicates with pipes 42 and 43 leading to the inlets of the synthesis reactor 15 and the synthesis gas generator 11 respectively. The predominant portion of the recycle passes through branch pipe 42 into the synthesis zone, the remainder in the critical minor amount equal to from 1 to 15 and preferably 2 to 10 per cent by volume of the total recycle gas, passing through pipe 43 into the inlet of the generator 11.

The reaction gases are withdrawn from contact with the catalyst in the synthesis zone 15 when the carbon monoxide content has fallen to about 1.5 to 4.0 volume per cent and preferably about 2 to 3 per cent, but before the hydrogen has fallen below 20 per cent and preferably before it has fallen below 25 per cent. The hydrogen content of the total feed gas charged to the reactor is in the range of 35 to 55 per cent by volume.

The figures in the table below are predicated upon a plant operating in accordance with the foregoing embodiment to process 87.5 millions of cubic feet of methane per day. In the generation zone, the methane is reacted with oxygen of about 99 per cent purity. The table compares recycling of tail gas from the synthesis operation to the synthesis reactor, exclusively, with operations where increasing proportions of the recycle stream are diverted to the gas generator.

With exclusive recycle to the synthesis zone, the rate of recycle is that which results in production of the maximum quantity of liquid hydrocarbons without objectionable catalyst degeneration. For this case, the production of liquid hydrocarbon is 7440 barrels per day.

In this operation, the hydrogen concentration of the gaseous effluent from the synthesis reactor is 25 volume per cent. The total oxygen consumption is 53.9 millions of cubic feet per day and the rate at which the tail gas must be recycled to the synthesis reactor to maintain maximum yield is 3.5 volumes per volume of methane charged to the generator.

The comparative effects of diverting small portions of the recycle to the generator are shown in the table as follows:

| Percent Increase in Liquid Product | Total Recycle to Methane Feed, v. v. | Percent of Total Recycle to Generator | Percent Increase in $O_2$ Consumption | $H_2$ Percent Volume | |
|---|---|---|---|---|---|
| | | | | Reactor Inlet | Reactor Outlet |
| 0 | 3.5 | 0 | 0 | 43 | 25 |
| 3.8 | 3.1 | 5 | 4.8 | 44 | 25 |
| 4.6 | 2.7 | 10 | 8.0 | 45 | 25 |
| 4.2 | 2.4 | 15 | 9.8 | 45 | 25 |
| 3.4 | 2.1 | 20 | 11.0 | 46 | 25 |

From this table, it is apparent that at 5 per cent of total recycle to the generator, the yield of liquid hydrocarbons is increased about 4 per cent without any increase in methane consumption, and at the cost of only about 5 per cent more oxygen. At 10 per cent generator recycle, about 5 per cent more liquid is produced for only about 8 per cent increase in oxygen consumption.

It is to be noted particularly that diversion of these small percentages of recycle to the generator also permits a decrease in the rate of total recycle, while still holding approximately the same hydrogen concentration in the synthesis reactor to assure comparable, long catalyst life. Manifestly, this decrease in total recycle reflects important economic advantages as regards savings in equipment size and compression power costs.

However, from the last line of the table, it is apparent that if as much as 20 per cent of the total recycle goes to the generator, the liquid yield is increased only 3 per cent, which is manifestly not warranted, at the additional 11 per cent increase in oxygen consumption required. Accordingly, it is apparent that the diversion of recycle to the generator should be not above 15 per cent, and preferably not above 10 per cent of the total recycle.

Instead of effecting a substantially absolute separation of the $C_3$ gases from the recycle stream to the reactor, it is permissible, as far as synthesis reactor recycle is concerned, to avoid the absorber treatment, and return the overhead, normally gaseous stream from the separator 25 directly to the inlet of the reactor. This alternative is indicated by the transfer pipe 45 connecting the pipe 30 from the separator to the inlet pipe 42 of the synthesis reactor.

In the foregoing disclosure, the total recycle has been described, both on the basis of the natural gas feed and the synthesis gas generated by the carbonaceous feed material supplied to the generator in the absence of recycle. Since one volume of methane will produce about three volumes of $CO+H_2$, it is readily apparent that the two bases of recycle ratio specified are consistent. As regards hydrocarbons or carbonaceous feeds other than natural gas or methane, the critical range of 0.7 to 1.6 total recycle per volume of synthesis gas generated in the absence of recycle prevails.

Obviously, many modifications and variations of the invention, as hereinbefore set forth, may be made without departing from the spirit and scope thereof, and, therefore, only such limitations should be imposed as are indicated in the appended claims.

We claim:

1. In the synthesis of liquid hydrocarbons of the motor fuel type by the process involving the steps of generating synthesis gas consisting of at least about 95% by volume of hydrogen and carbon monoxide in a molar ratio of hydrogen to carbon monoxide of about 1.8:1 to 2.1:1 by the partial combustion of a carbonaceous fuel with oxygen and of reducing said carbon monoxide by said hydrogen in the presence of an iron catalyst at an elevated pressure and temperature to synthesize said liquid hydrocarbons, the improvement of simultaneously effecting a high yield of said liquid hydrocarbons and maintaining a long life in said iron catalyst, which comprises maintaining a hydrogen content in the range of about 35% to 55% by volume in the total gas feed charged into the catalytic synthesis reaction zone, withdrawing the reaction gases from said synthesis zone after the carbon monoxide content thereof has fallen to about 1.5% to 4% by volume but before the hydrogen content thereof has fallen below about 20% by volume, recovering from the withdrawn gases a tail gas substantially free of $C_3$ and higher hydrocarbons, and recycling to said step of generating synthesis gas and to said synthesis zone a total of about 0.7 to 1.6 volumes of said tail gas for each volume of synthesis gas that would be generated in the absence of recycling, said recycling being divided so that about 1% to 15% by volume of the recycled tail gas is returned to said step of generating synthesis gas and the remainder of the recycled tail gas is returned to said synthesis zone.

2. In the synthesis of liquid hydrocarbons of the motor fuel type by the process involving the steps of generating synthesis gas consisting of at least about 95% by volume of hydrogen and carbon monoxide in a molar ratio of hydrogen to carbon monoxide of about 1.8:1 to 2.1:1 by the partial combustion of a carbonaceous fuel with oxygen and of reducing said carbon monoxide by said hydrogen in the presence of an iron catalyst at an elevated pressure and temperature to synthesize said liquid hydrocarbons, the improvement of simultaneously effecting a high yield of said liquid hydrocarbons and maintaining a long life in said iron catalyst, which comprising maintaining a hydrogen content in the range of about 40% to 50% by volume in the total gas feed charged into the catalytic synthesis reaction zone, withdrawing the reaction gases from said synthesis zone after the carbon monoxide content thereof has fallen to about 2% to 3% by volume but before the hydrogen content thereof has fallen below about 25% by volume, recovering from the withdrawn gases a tail gas substantially free of $C_3$ and higher hydrocarbons, and recycling to said step of generating synthesis gas and to said synthesis zone a total of about 0.7 to 1.6 volumes of said tail gas for each volume of synthesis gas that would be generated in the absence of recycling, said recycling being divided so that about 2% to 10% by volume of the recycled tail gas is returned to said step of generating synthesis gas and the remainder of the recycled tail gas is returned to said synthesis zone.

3. In the synthesis of liquid hydrocarbons of the motor fuel type by the process involving the steps of generating synthesis gas consisting of at least about 95% by volume of hydrogen and carbon monoxide in a molar ratio of hydrogen to carbon monoxide of about 1.8:1 to 2.1:1 by the partial combustion of natural gas consisting of at least about 95% by volume of hydrocarbons with oxygen and of reducing said carbon monoxide by said hydrogen in the presence of an iron catalyst at an elevated pressure and temperature to synthesize said liquid hydrocarbons, the improvement of simultaneously effecting a high yield of said liquid hydrocarbons and maintaining a long life in said iron catalyst, which comprises maintaining a hydrogen content in the range of about 35% to 55% by volume in the total gas feed charged into the catalytic synthesis reaction zone, withdrawing the reaction gases from said synthesis zone after the carbon monoxide content thereof has fallen to about 1.5% to 4% by volume but before the hydrogen content thereof has fallen below about 20% by volume, recovering from the withdrawn gases a tail gas substantially free of $C_3$ and higher hydrocarbons, and recycling to said step of generating synthesis gas and to said synthesis zone a total of about 2.0 to 4.5 volumes of said tail gas for each volume of said natural gas supplied to the step of generating synthesis gas, said recycling being divided so that about 1% to 15% by volume of the recycled tail gas is returned to said step of generating synthesis gas and the remainder of the recycled tail gas is returned to said synthesis zone.

4. In the synthesis of liquid hydrocarbons of the motor fuel type by the process involving the steps of generating synthesis gas consisting of at least about 95% by volume of hydrogen and carbon monoxide in a molar ratio of hydrogen to carbon monoxide of about 1.8:1 to 2.1:1 by the partial combustion of natural gas consisting of at least about 95% by volume of hydrocarbons with oxygen and of reducing said carbon monoxide by said hydrogen in the presence of an iron catalyst at an elevated pressure and temperature to synthesize said liquid hydrocarbons, the improvement of simultaneously effecting a high yield of said liquid hydrocarbons and maintaining a long life in said iron catalyst, which comprises maintaining a hydrogen content in the range of about 40% to 50% by volume in the total gas feed charged into the catalytic synthesis reaction zone, withdrawing the reaction gases from said synthesis zone after the carbon monoxide content thereof has fallen to about 2% to 3% by volume but before the hydrogen content thereof has fallen below about 25% by volume, recovering from the withdrawn gases a tail gas substantially free of $C_3$ and higher hydrocarbons, and recycling to said step of generating synthesis gas and to said synthesis zone a total of about 2.0 to 4.5 volumes of said tail gas for each volume of said natural gas supplied to the step of generating synthesis gas, said recycling being divided so that about 2% to 10% by volume of recycled tail gas is returned to said step of generating synthesis gas and the remainder of the recycled tail gas is returned to said synthesis zone.

JOHN H. ARNOLD.
FREDERICK B. GROSSELFINGER.

REFERENCES CITED

The following references are of record in the file of this patent:

UNITED STATES PATENTS

| Number | Name | Date |
|---|---|---|
| 2,417,164 | Huber, Jr. | Mar. 11, 1947 |
| 2,434,537 | Barr et al. | Jan. 13, 1948 |
| 2,455,419 | Johnson | Dec. 7, 1948 |
| 2,498,838 | Griffin | Feb. 28, 1950 |